United States Patent
Feulner et al.

(10) Patent No.: US 10,125,691 B2
(45) Date of Patent: Nov. 13, 2018

(54) BOWED ROTOR START USING A VARIABLE POSITION STARTER VALVE

(71) Applicant: United Technologies Corporation, Farmington, CT (US)

(72) Inventors: Matthew R. Feulner, West Hartford, CT (US); Frederick M. Schwarz, Glastonbury, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 232 days.

(21) Appl. No.: 15/042,382

(22) Filed: Feb. 12, 2016

(65) Prior Publication Data

US 2017/0234236 A1 Aug. 17, 2017

(51) Int. Cl.
| | |
|---|---|
| *F02C 7/26* | (2006.01) |
| *F02C 7/277* | (2006.01) |
| *F01D 19/02* | (2006.01) |
| *F02C 7/18* | (2006.01) |
| *F02C 9/00* | (2006.01) |

(52) U.S. Cl.
CPC .............. *F02C 7/277* (2013.01); *F01D 19/02* (2013.01); *F02C 7/18* (2013.01); *F02C 9/00* (2013.01); *F05D 2260/20* (2013.01); *F05D 2260/85* (2013.01); *F05D 2260/96* (2013.01); *F05D 2270/02* (2013.01); *F05D 2270/114* (2013.01); *Y02T 50/676* (2013.01)

(58) Field of Classification Search
CPC .. F02C 7/268; F02C 7/27; F02C 7/272; F02C 7/275; F02C 7/277; F02C 3/107; F02C 9/00; F01D 19/02; F05D 2260/85; F05D 2270/021; F05D 2270/114; F05D 2270/304; F05D 2270/334
See application file for complete search history.

(56) References Cited

U.S. PATENT DOCUMENTS

| | | |
|---|---|---|
| 1,951,875 A | 3/1934 | Laabs |
| 2,617,253 A | 11/1952 | Fusner et al. |
| 2,962,597 A | 11/1960 | Evans |
| 3,057,155 A | 10/1962 | Rizk |
| 3,151,452 A | 10/1964 | Bunger et al. |
| 3,290,709 A | 12/1966 | Whitenack, Jr. et al. |

(Continued)

FOREIGN PATENT DOCUMENTS

| | | |
|---|---|---|
| EP | 1396611 | 3/2004 |
| EP | 1533479 A2 | 5/2005 |

(Continued)

OTHER PUBLICATIONS

EP Application No. 17155584 Extended European Search Report dated Jul. 6, 2017, 9 pages.

(Continued)

*Primary Examiner* — Steven Sutherland
(74) *Attorney, Agent, or Firm* — Cantor Colburn LLP

(57) ABSTRACT

A bowed rotor start mitigation system for a gas turbine engine is provided. The bowed rotor start mitigation system includes a variable position starter valve and a controller. The controller is operable to dynamically adjust the variable position starter valve to deliver a starter air supply to a starter to drive rotation of a starting spool of the gas turbine engine according to a dry motoring profile that continuously varies a rotor speed of the starting spool up to a point below a critical rotor speed.

19 Claims, 6 Drawing Sheets

(56) References Cited

U.S. PATENT DOCUMENTS

| | | |
|---|---|---|
| 3,360,844 A | 1/1968 | Wonneman |
| 3,764,815 A | 10/1973 | Habock et al. |
| 3,793,905 A | 2/1974 | Black et al. |
| 3,898,439 A | 8/1975 | Reed et al. |
| 3,951,008 A | 4/1976 | Schneider et al. |
| 4,044,550 A | 8/1977 | Vermilye |
| 4,069,424 A | 1/1978 | Burkett |
| 4,120,159 A | 10/1978 | Matsumoto et al. |
| 4,144,421 A | 3/1979 | Sakai |
| 4,302,813 A | 11/1981 | Kurihara et al. |
| 4,353,604 A | 10/1982 | Dulberger et al. |
| 4,380,146 A | 4/1983 | Yannone et al. |
| 4,426,641 A | 1/1984 | Kurihara et al. |
| 4,435,770 A | 3/1984 | Shiohata et al. |
| 4,437,163 A | 3/1984 | Kurihara et al. |
| 4,453,407 A | 6/1984 | Sato et al. |
| 4,485,678 A | 12/1984 | Fanuele |
| 4,488,240 A | 12/1984 | Kapadia et al. |
| 4,496,252 A | 1/1985 | Horler et al. |
| 4,598,551 A | 7/1986 | Dimitroff, Jr. et al. |
| 4,627,234 A | 12/1986 | Schuh |
| 4,642,782 A | 2/1987 | Kemper et al. |
| 4,669,893 A | 6/1987 | Chalaire et al. |
| 4,713,985 A | 12/1987 | Ando |
| 4,733,529 A | 3/1988 | Nelson et al. |
| 4,747,270 A | 5/1988 | Klie et al. |
| 4,854,120 A | 8/1989 | Nelson et al. |
| 4,979,362 A | 12/1990 | Vershure, Jr. |
| 5,103,629 A | 4/1992 | Mumford et al. |
| 5,123,239 A | 6/1992 | Rodgers |
| 5,127,220 A | 7/1992 | Jesrai et al. |
| 5,174,109 A | 12/1992 | Lampe |
| 5,184,458 A | 2/1993 | Lampe et al. |
| 5,201,798 A | 4/1993 | Hogan |
| 5,349,814 A | 9/1994 | Ciokajlo et al. |
| 6,146,090 A | 11/2000 | Schmidt |
| 6,168,377 B1 | 1/2001 | Wolfe et al. |
| 6,190,127 B1 | 2/2001 | Schmidt |
| 6,318,958 B1 | 11/2001 | Giesler et al. |
| 6,478,534 B2 | 11/2002 | Bangert et al. |
| 6,498,978 B2 | 12/2002 | Leamy et al. |
| 6,517,314 B1 | 2/2003 | Burnett et al. |
| 6,558,118 B1 | 5/2003 | Brisson et al. |
| 6,681,579 B2 | 1/2004 | Lane et al. |
| 6,762,512 B2 | 7/2004 | Nelson |
| 7,104,072 B2 | 9/2006 | Thompson |
| 7,133,801 B2 | 11/2006 | Song |
| 7,409,319 B2 | 8/2008 | Kant et al. |
| 7,428,819 B2 | 9/2008 | Cataldi et al. |
| 7,507,070 B2 | 3/2009 | Jones |
| 7,543,439 B2 | 6/2009 | Butt et al. |
| 7,587,133 B2 | 9/2009 | Franke et al. |
| 7,742,881 B2 | 6/2010 | Muralidharan et al. |
| 7,798,720 B1 | 9/2010 | Walsh |
| 7,909,566 B1 | 3/2011 | Brostmeyer |
| 7,972,105 B2 | 7/2011 | Dejoris et al. |
| 8,090,456 B2 | 1/2012 | Karpman et al. |
| 8,291,715 B2 | 10/2012 | Libera et al. |
| 8,306,776 B2 | 11/2012 | Ihara et al. |
| 8,770,913 B1 | 7/2014 | Negron et al. |
| 8,776,530 B2 | 7/2014 | Shirooni et al. |
| 8,820,046 B2 | 9/2014 | Ross et al. |
| 8,918,264 B2 | 12/2014 | Jegu et al. |
| 9,086,018 B2 | 7/2015 | Winston et al. |
| 9,121,309 B2 | 9/2015 | Geiger |
| 9,699,833 B2 | 7/2017 | Broughton et al. |
| 2002/0173897 A1 | 11/2002 | Leamy et al. |
| 2003/0145603 A1 | 8/2003 | Reed et al. |
| 2004/0065091 A1 | 4/2004 | Anderson |
| 2004/0131138 A1 | 7/2004 | Correia et al. |
| 2006/0032234 A1 | 2/2006 | Thompson |
| 2006/0260323 A1 | 11/2006 | Moulebhar |
| 2007/0031249 A1 | 2/2007 | Jones |
| 2008/0072568 A1 | 3/2008 | Moniz et al. |
| 2009/0246018 A1 | 10/2009 | Kondo et al. |
| 2009/0301053 A1 | 12/2009 | Geiger |
| 2009/0314002 A1 | 12/2009 | Libera et al. |
| 2010/0095791 A1 | 4/2010 | Galloway |
| 2010/0132365 A1 | 6/2010 | Labala |
| 2010/0293961 A1 | 11/2010 | Tong et al. |
| 2010/0326085 A1 | 12/2010 | Veilleux |
| 2011/0077783 A1 | 3/2011 | Karpman et al. |
| 2011/0146276 A1 | 6/2011 | Sathyanarayana et al. |
| 2011/0153295 A1 | 6/2011 | Yerramalla et al. |
| 2011/0296843 A1 | 12/2011 | Lawson, Jr. |
| 2012/0031067 A1 | 2/2012 | Sundaram et al. |
| 2012/0240591 A1 | 9/2012 | Snider et al. |
| 2012/0266601 A1 | 10/2012 | Miller |
| 2012/0316748 A1 | 12/2012 | Jegu et al. |
| 2013/0031912 A1 | 2/2013 | Finney et al. |
| 2013/0091850 A1 | 4/2013 | Francisco |
| 2013/0101391 A1 | 4/2013 | Szwedowicz et al. |
| 2013/0134719 A1 | 5/2013 | Watanabe et al. |
| 2013/0251501 A1 | 9/2013 | Araki et al. |
| 2014/0060076 A1 | 3/2014 | Cortelli et al. |
| 2014/0123673 A1 | 5/2014 | Mouze et al. |
| 2014/0199157 A1 | 7/2014 | Haerms et al. |
| 2014/0236451 A1 | 8/2014 | Gerez et al. |
| 2014/0241878 A1 | 8/2014 | Herrig et al. |
| 2014/0271152 A1 | 9/2014 | Rodriguez |
| 2014/0301820 A1 | 10/2014 | Lohse et al. |
| 2014/0318144 A1 | 10/2014 | Lazzeri et al. |
| 2014/0334927 A1 | 11/2014 | Hammerum |
| 2014/0366546 A1 | 12/2014 | Bruno et al. |
| 2014/0373518 A1 | 12/2014 | Manneville et al. |
| 2014/0373552 A1 | 12/2014 | Zaccaria et al. |
| 2014/0373553 A1 | 12/2014 | Zaccaria et al. |
| 2014/0373554 A1 | 12/2014 | Pech et al. |
| 2015/0016949 A1 | 1/2015 | Smith |
| 2015/0115608 A1 | 4/2015 | Draper |
| 2015/0121874 A1 | 5/2015 | Yoshida et al. |
| 2015/0128592 A1 | 5/2015 | Filiputti et al. |
| 2015/0159625 A1 | 6/2015 | Hawdwicke, Jr. et al. |
| 2015/0219121 A1 | 8/2015 | King |
| 2015/0377141 A1 | 12/2015 | Foiret |
| 2016/0236369 A1 | 8/2016 | Baker |
| 2016/0245312 A1 | 8/2016 | Morice |
| 2016/0265387 A1 | 9/2016 | Duong et al. |
| 2016/0288325 A1 | 10/2016 | Naderer et al. |
| 2017/0030265 A1 | 2/2017 | O'Toole et al. |
| 2017/0218848 A1 | 8/2017 | Alstad et al. |
| 2017/0233103 A1 | 8/2017 | Teicholz et al. |
| 2017/0234158 A1 | 8/2017 | Savela |
| 2017/0234166 A1 | 8/2017 | Dube et al. |
| 2017/0234167 A1 | 8/2017 | Stachowiak et al. |
| 2017/0234230 A1 | 8/2017 | Schwarz et al. |
| 2017/0234231 A1 | 8/2017 | Virtue, Jr. et al. |
| 2017/0234232 A1 | 8/2017 | Sheridan et al. |
| 2017/0234233 A1 | 8/2017 | Schwarz et al. |
| 2017/0234235 A1 | 8/2017 | Pech |
| 2017/0234238 A1 | 8/2017 | Schwarz et al. |
| 2018/0010480 A1 | 1/2018 | Hockaday et al. |

FOREIGN PATENT DOCUMENTS

| | | |
|---|---|---|
| EP | 1862875 | 12/2007 |
| EP | 2006496 | 12/2008 |
| EP | 2305986 | 4/2011 |
| EP | 2363575 A2 | 9/2011 |
| EP | 2871333 | 5/2015 |
| EP | 3051074 | 8/2016 |
| FR | 2933131 | 1/2010 |
| GB | 1374810 | 11/1974 |
| GB | 2117842 | 10/1983 |
| GB | 2218751 | 11/1989 |
| IN | 201408865 | 5/2015 |
| JP | 2002371806 | 12/2002 |
| JP | 2004036414 | 2/2004 |
| WO | 9900585 | 1/1999 |
| WO | 2013007912 | 1/2013 |
| WO | 2014152701 | 9/2014 |
| WO | 2015030946 | 3/2015 |
| WO | 2016069303 | 5/2016 |

(56) References Cited

FOREIGN PATENT DOCUMENTS

OTHER PUBLICATIONS

EP Application No. 17155601 Extended European Search Report dated Jun. 30, 2017, 7 pages.
EP Application No. 17155612 Extended European Search Report dated Jul. 4, 2017, 8 pages.
EP Application No. 17155613 Extended European Search Report dated Jun. 27, 2017, 10 pages.
EP Application No. 17155683 Extended European Search Report dated Jun. 30, 2017, 8 pages.
EP Application No. 17155687 Extended European Search Report dated Jun. 16, 2017, 9 pages.
EP Application No. 17155698 Extended European Search Report dated Jun. 21, 2017, 9 pages.
EP Application No. 17155721 Extended European Search Report dated Jun. 27, 2017, 8 pages.
EP Application No. 17155793 Extended European Search Report dated Jun. 30, 2017, 10 pages.
EP Application No. 17155798 Extended European Search Report dated Jun. 30, 2017, 9 pages.
EP Application No. 17155807 Extended European Search Report dated Jul. 3, 2017, 8 pages.
U.S. Appl. No. 15/042,331 Non-Final Office Action dated Sep. 9, 2016, 37 pages.
Extended European Search Report for Application No. 17179407.6-1610 dated Dec. 5, 2017 (8 pp.).
EP Application No. 17155683 Office Action dated May 22, 2018, 2 pages.

BOWED ROTOR START USING A VARIABLE POSITION STARTER VALVE

BACKGROUND

This disclosure relates to gas turbine engines, and more particularly to an apparatus, system and method for mitigating a bowed rotor start condition using a variable position starter valve to control rotor speed in a gas turbine engine.

Gas turbine engines are used in numerous applications, one of which is for providing thrust to an airplane. When the gas turbine engine of an airplane has been shut off for example, after an airplane has landed at an airport, the engine is hot and due to heat rise, the upper portions of the engine will be hotter than lower portions of the engine. When this occurs thermal expansion may cause deflection of components of the engine which may result in a "bowed rotor" condition. If a gas turbine engine is in such a "bowed rotor" condition it is undesirable to restart or start the engine.

Accordingly, it is desirable to provide a method and/or apparatus for mitigating a "bowed rotor" condition.

BRIEF DESCRIPTION

In an embodiment, a bowed rotor start mitigation system for a gas turbine engine is provided. The bowed rotor start mitigation system includes a variable position starter valve and a controller. The controller is operable to dynamically adjust the variable position starter valve to deliver a starter air supply to a starter to drive rotation of a starting spool of the gas turbine engine according to a dry motoring profile that continuously varies a rotor speed of the starting spool up to a point below a critical rotor speed.

In addition to one or more of the features described above, or as an alternative to any of the foregoing embodiments, further embodiments may include where the dry motoring profile is essentially increasing continuously.

In addition to one or more of the features described above, or as an alternative to any of the foregoing embodiments, further embodiments may include where the controller monitors the rotor speed and dynamically adjusts a valve angle of the variable position starter valve to maintain the rotor speed along a target rotor speed profile defined in the dry motoring profile.

In addition to one or more of the features described above, or as an alternative to any of the foregoing embodiments, further embodiments may include where the target rotor speed profile extends above the critical rotor speed and the controller dynamically adjusts the valve angle of the variable position starter valve to maintain the rotor speed along the target rotor speed profile across the critical rotor speed up to an engine idle speed.

In addition to one or more of the features described above, or as an alternative to any of the foregoing embodiments, further embodiments may include where a slope of the target rotor speed profile in the dry motoring profile is adjusted and maintains a positive slope while bowed rotor start mitigation is active based on determining that a vibration level of the gas turbine engine is less than a targeted maximum range.

In addition to one or more of the features described above, or as an alternative to any of the foregoing embodiments, further embodiments may include where the variable position starter valve has a response rate of 0% to 100% open in less than 40 seconds.

In addition to one or more of the features described above, or as an alternative to any of the foregoing embodiments, further embodiments may include where the dry motoring profile is determined based on reading data from one or more temperature sensors of the gas turbine engine.

In addition to one or more of the features described above, or as an alternative to any of the foregoing embodiments, further embodiments may include where the gas turbine engine is a turbofan and the starter air supply is provided from an auxiliary power unit.

In addition to one or more of the features described above, or as an alternative to any of the foregoing embodiments, further embodiments may include where based on determining that bowed rotor start mitigation is complete, the controller is operable to monitor a vibration level of the gas turbine engine while sweeping through a range of rotor speeds including the critical rotor speed and determine whether the bowed rotor start mitigation was successful prior to starting the gas turbine engine.

According to an embodiment, a gas turbine engine system includes a motoring system, a speed pickup, and an electronic engine control. The motoring system includes a variable position starter valve and a starter operable to drive rotation of a starting spool of a gas turbine engine. The electronic engine control is operable to receive a speed input from the speed pickup indicative of a rotor speed of the starting spool and a valve angle feedback from the variable position starter valve. The electronic engine control is further operable to drive motoring of the starting spool by controlling the variable position starter valve to continuously increase the rotor speed of the gas turbine engine up to a critical rotor speed through the starter according to a dry motoring profile based on the rotor speed and the valve angle feedback while bowed rotor start mitigation is active.

In addition to one or more of the features described above, or as an alternative to any of the foregoing embodiments, further embodiments may include where a target rotor speed profile of the dry motoring profile is dynamically determined to drive the rotor speed to a set value and accelerate the rotor speed through the critical rotor speed.

In addition to one or more of the features described above, or as an alternative to any of the foregoing embodiments, further embodiments may include where one or more initial values of the dry motoring profile are determined based on reading data from one or more temperature sensors of the gas turbine engine.

According to an embodiment, a method of bowed rotor start mitigation for a gas turbine engine includes receiving a speed input indicative of a rotor speed of a starting spool of the gas turbine engine. A valve angle feedback is received by the controller from a variable position starter valve of the gas turbine engine. The variable position starter valve is controlled to continuously increase the rotor speed of the starting spool up to a critical rotor speed through a starter according to a dry motoring profile based on the rotor speed and the valve angle feedback while bowed rotor start mitigation is active.

In addition to one or more of the features described above, or as an alternative to any of the foregoing embodiments, further embodiments may include where the rotor speed is controlled to track to a target rotor speed profile of the dry motoring profile that drives the rotor speed to a set value and accelerates the rotor speed through the critical rotor speed.

In addition to one or more of the features described above, or as an alternative to any of the foregoing embodiments, further embodiments may include monitoring a rate of change of the rotor speed, projecting whether the rotor speed will align with the target rotor speed profile at a future time based on the rate of change of the rotor speed, and adjusting a valve angle of the variable position starter valve based on determining that the rotor speed will not align with the target rotor speed profile at a future time.

In addition to one or more of the features described above, or as an alternative to any of the foregoing embodiments, further embodiments may include adjusting a slope of the target rotor speed profile in the dry motoring profile while the bowed rotor start mitigation is active based on determining that a vibration level of the gas turbine engine is outside of an expected range.

In addition to one or more of the features described above, or as an alternative to any of the foregoing embodiments, further embodiments may include where wherein adjusting the slope of the target rotor speed profile further comprises maintaining a positive slope.

In addition to one or more of the features described above, or as an alternative to any of the foregoing embodiments, further embodiments may include determining the dry motoring profile based on reading data from one or more temperature sensors of the gas turbine engine prior to driving rotation of the gas turbine engine while the bowed rotor start mitigation is active.

In addition to one or more of the features described above, or as an alternative to any of the foregoing embodiments, further embodiments may include where the variable position starter valve is initially set to a valve angle of greater than 50% open when the bowed rotor start mitigation is active.

In addition to one or more of the features described above, or as an alternative to any of the foregoing embodiments, further embodiments may include based on determining that the bowed rotor start mitigation is complete, monitoring a vibration level of the gas turbine engine while sweeping through a range of rotor speeds including the critical rotor speed, and determining whether the bowed rotor start mitigation was successful prior to starting the gas turbine engine.

A technical effect of the apparatus, systems and methods is achieved by using a start sequence for a gas turbine engine as described herein.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Figure 1:
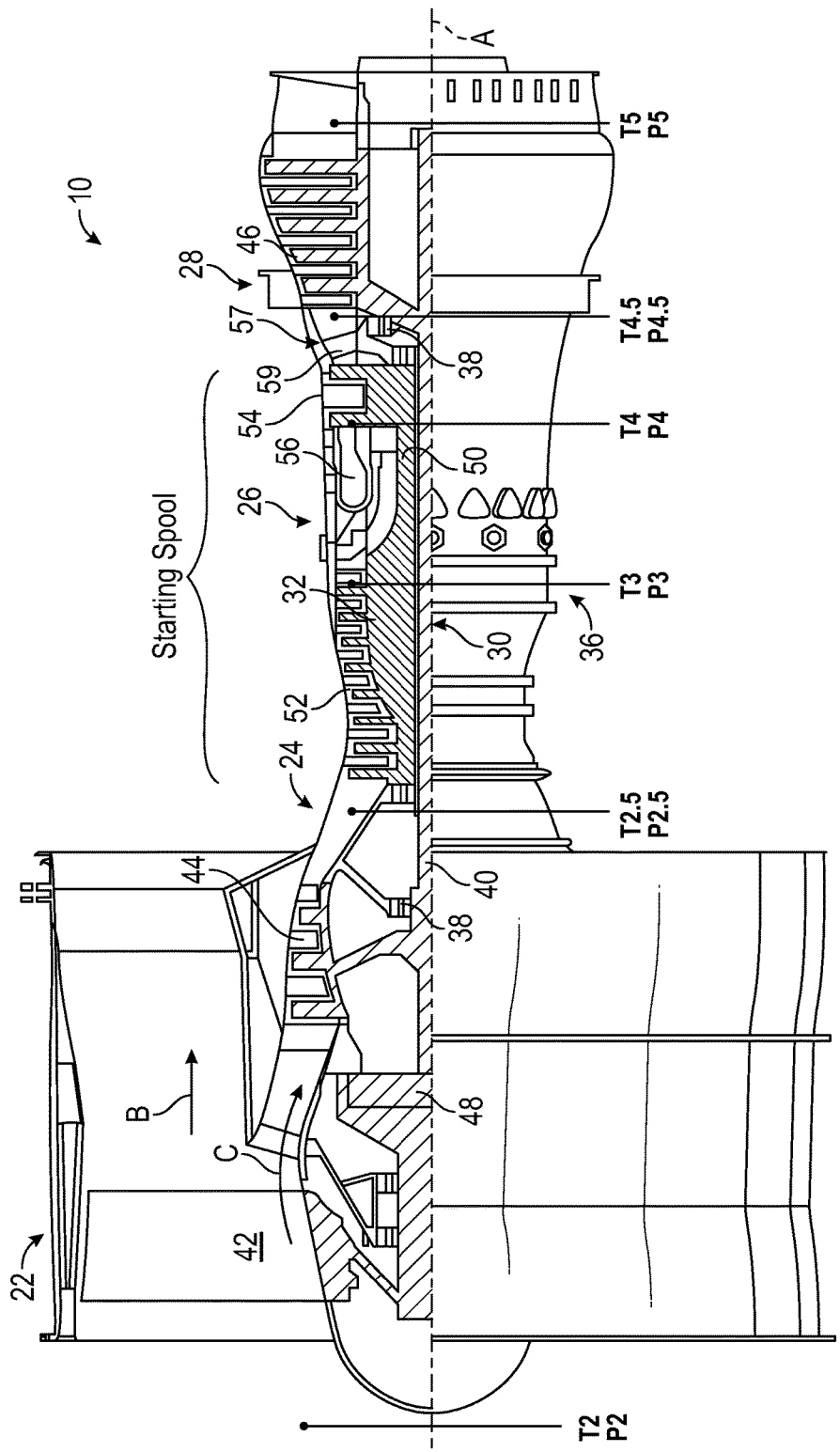
FIG. 1 is a cross-sectional view of a gas turbine engine.

Various embodiments of the present disclosure are related to a bowed rotor start mitigation system in a gas turbine engine. Embodiments can include using a variable position starter valve to precisely control a rotor speed of a starting spool of the gas turbine engine to mitigate a bowed rotor condition using a dry motoring process. During dry motoring, the variable position starter valve can be actively adjusted to deliver air pressure from an air supply to an engine starting system that accurately controls starting rotor speed. Dry motoring may be performed by running an engine starting system at a lower speed with a longer duration than typically used for engine starting while dynamically adjusting the variable position starter valve to follow a dry motoring profile. Embodiments increase the rotor speed of the starting spool to approach a critical rotor speed gradually as thermal distortion is decreased and accelerate beyond the critical rotor speed to complete the engine starting process. The critical rotor speed refers to a major resonance speed where, if the temperatures are unhomogenized, the combination of a bowed rotor and similarly bowed casing and the resonance would lead to high amplitude oscillation in the rotor and high rubbing of blade tips on one side of the rotor, especially in the high pressure compressor if the rotor is straddle-mounted.

A dry motoring profile for dry motoring can be selected based on various parameters, such as a measured temperature value of the gas turbine engine used to estimate heat stored in the engine core when a start sequence is initiated and identify a risk of a bowed rotor. The measured temperature value alone or in combination with other values can be used to calculate a bowed rotor risk parameter. For example, the measured temperature can be adjusted relative to an ambient temperature when calculating the bowed rotor risk parameter. The bowed rotor risk parameter may be used to take a control action to mitigate the risk of starting the gas turbine engine with a bowed rotor. The control action can include dry motoring consistent with the dry motoring profile. In some embodiments, a targeted rotor speed profile of the dry motoring profile can be adjusted as dry motoring is performed. As one example, if excessive vibration is detected as the rotor speed rises and approaches but remains well below the critical rotor speed, then the rate of rotor speed increases scheduled in the dry motoring profile can be reduced (i.e., a shallower slope) to extend the dry motoring time. Similarly, if vibration levels are observed below an expected minimum vibration level as the rotor speed increases, the dry motoring profile can be adjusted to a higher rate of rotor speed increases to reduce the dry motoring time.

A full authority digital engine control (FADEC) system or other system may send a message to the cockpit to inform the crew of an extended time start time due to bowed rotor mitigation actions prior to completing an engine start sequence. If the engine is in a ground test or in a test stand, a message can be sent to the test stand or cockpit based on the control-calculated risk of a bowed rotor. A test stand crew can be alerted regarding a requirement to keep the starting spool of the engine to a speed below the known resonance speed of the rotor in order to homogenize the temperature of the rotor and the casings about the rotor which also are distorted by temperature non-uniformity.

Monitoring of vibration signatures during the engine starting sequence can also or separately be used to assess the risk that a bowed rotor start has occurred due to some system malfunction and then direct maintenance, for instance, in the case of suspected outer air seal rub especially in the high compressor. Vibration data for the engine can also be monitored after bowed rotor mitigation is performed during an engine start sequence to confirm success of bowed rotor mitigation. If bowed rotor mitigation is unsuccessful or determined to be incomplete by the FADEC, resulting metrics (e.g., time, date, global positioning satellite (GPS) coordinates, vibration level vs. time, etc.) of the attempted bowed rotor mitigation can be recorded and/or transmitted to direct maintenance Referring now to FIG. 1, a schematic illustration of a gas turbine engine 10 is provided. The gas turbine engine 10 has among other components a fan through which ambient air is propelled into the engine housing, a compressor for pressurizing the air received from the fan and a combustor wherein the compressed air is mixed with fuel and ignited for generating combustion gases. The gas turbine engine 10 further comprises a turbine section for extracting energy from the combustion gases. Fuel is injected into the combustor of the gas turbine engine 10 for mixing with the compressed air from the compressor and ignition of the resultant mixture. The fan, compressor, combustor, and turbine are typically all concentric about a central longitudinal axis of the gas turbine engine 10. Thus, thermal deflection of the components of the gas turbine engine 10 may create the aforementioned bowing or "bowed rotor" condition along the common central longitudinal axis of the gas turbine engine 10 and thus it is desirable to clear or remove the bowed condition prior to the starting or restarting of the gas turbine engine 10.

FIG. 1 schematically illustrates a gas turbine engine 10 that can be used to power an aircraft, for example. The gas turbine engine 10 is disclosed herein as a multi-spool turbofan that generally incorporates a fan section 22, a compressor section 24, a combustor section 26 and a turbine section 28. The fan section 22 drives air along a bypass flowpath while the compressor section 24 drives air along a core flowpath for compression and communication into the combustor section 26 then expansion through the turbine section 28. Although depicted as a turbofan gas turbine engine in the disclosed non-limiting embodiment with two turbines and is sometimes referred to as a two spool engine, it should be understood that the concepts described herein are not limited to use with turbofans as the teachings may be applied to other types of turbine engines including three-spool architectures. In both of these architectures the starting spool is that spool that is located around the combustor, meaning the compressor part of the starting spool is flowing directly into the combustor and the combustor flows directly into the turbine section.

The engine 10 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that interconnects a fan 42, a low pressure compressor 44 and a low pressure turbine 46. The inner shaft 40 is connected to the fan 42 through a geared architecture 48 to drive the fan 42 at a lower speed than the low speed spool 30 in the example of FIG. 1. The high speed spool 32 includes an outer shaft 50 that interconnects a high pressure compressor 52 and high pressure turbine 54. The high speed spool 32 is also referred to as a starting spool, as an engine starting system drives rotation of the high speed spool 32. A combustor 56 is arranged between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path. The turbines 46, 54 rotationally drive the respective low speed spool 30 and high speed spool 32 in response to the expansion.

A number of stations for temperature and pressure measurement/computation are defined with respect to the gas turbine engine 10 according to conventional nomenclature. Station 2 is at an inlet of low pressure compressor 44 having a temperature T2 and a pressure P2. Station 2.5 is at an exit of the low pressure compressor 44 having a temperature T2.5 and a pressure P2.5. Station 3 is at an inlet of the combustor 56 having a temperature T3 and a pressure P3. Station 4 is at an exit of the combustor 56 having a temperature T4 and a pressure P4. Station 4.5 is at an exit of the high pressure turbine 54 having a temperature T4.5 and a pressure P4.5. Station 5 is at an exit of the low pressure turbine 46 having a temperature T5 and a pressure P5. Measured temperatures in embodiments may be acquired at one or more stations 2-5. For example, temperature T3 at station 3 can be used to as an engine rotor temperature measurement when there is no engine rotation. Alternatively, if available, temperature values at stations 4 (T4), 4.5 (T4.5), and/or 5 (T5) can be used as an engine rotor temperature. Temperature measurements can be normalized to account for hot day/cold day differences. For instance, temperature T2 can be used as an ambient temperature and a measured temperature (e.g., T3) can be normalized by subtracting temperature T2.

Figure 7:
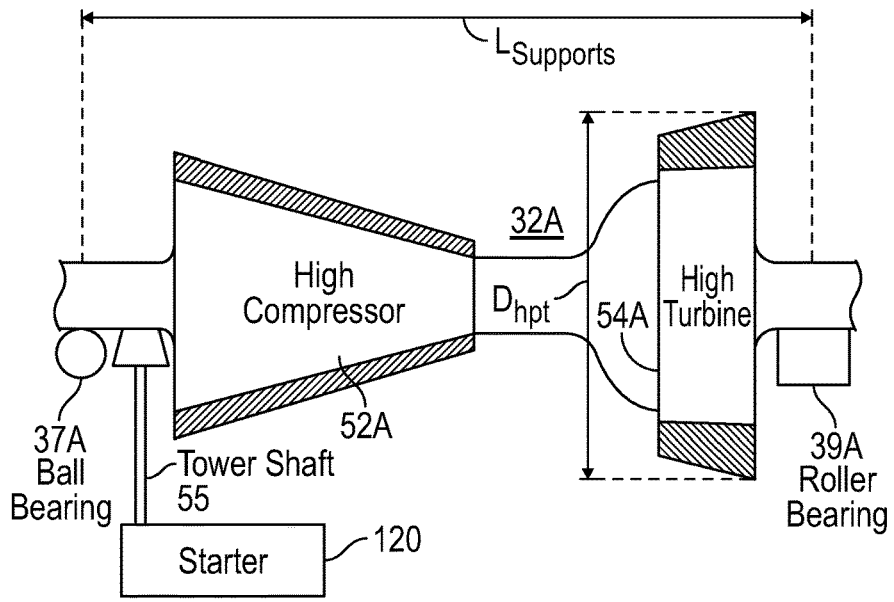
FIG. 7 is a schematic illustration of a high spool gas path with a straddle-mounted spool in accordance with an embodiment of the disclosure.
Figure 8:
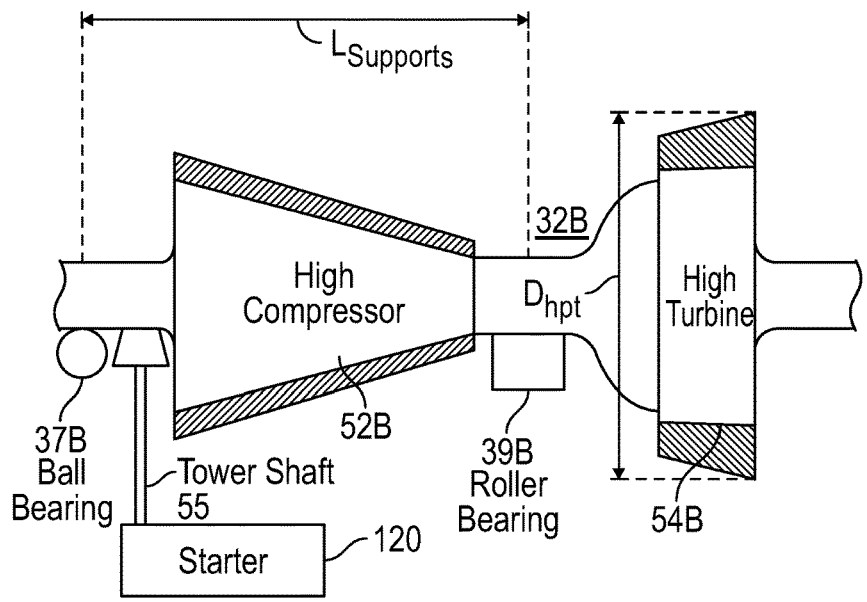
FIG. 8 is a schematic illustration of a high spool gas path with an overhung spool in accordance with an embodiment of the disclosure.

Although FIG. 1 depicts one example configuration, it will be understood that embodiments as described herein can cover a wide range of configurations. For example, embodiments may be implemented in a configuration that is described as a "straddle-mounted" spool 32A of FIG. 7. This configuration places two bearing compartments 37A and 39A (which may include a ball bearing and a roller bearing respectively), outside of the plane of most of the compressor disks of high pressure compressor 52A and at outside at least one of the turbine disks of high pressure turbine 54A. In contrast with a straddle-mounted spool arrangement, other embodiments may be implemented using an over-hung mounted spool 32B as depicted in FIG. 8. In over-hung mounted spool 32B, a bearing compartment 37B is located forward of the first turbine disk of high pressure turbine 54B such that the high pressure turbine 54B is overhung, and it is physically located aft of its main supporting structure. The use of straddle-mounted spools has advantages and disadvantages in the design of a gas turbine, but one characteristic of the straddle-mounted design is that the span between the bearing compartments 37A and 39A is long, making the amplitude of the high spot of a bowed rotor greater and the resonance speed that cannot be transited prior to temperature homogenization is lower. For any thrust rating, the straddle mounted arrangement, such as straddle-mounted spool 32A, gives Lsupport/Dhpt values that are higher, and the overhung mounted arrangement, such as overhung spool 32B, can be as much as 60% of the straddle-mounted Lsupport/Dhpt. Lsupport is the distance between bearings (e.g., between bearing compartments 37A and 39A or between bearing compartments 37B and 39B), and Dhpt is the diameter of the last blade of the high pressure turbine (e.g., high pressure turbine 54A or high pressure turbine 54B). As one example, a straddle-mounted engine starting spool, such as straddle-mounted spool 32A, with a roller bearing at bearing compartment 39A located aft of the high pressure turbine 54A may be more vulnerable to bowed rotor problems since the Lsupport/Dhpt ranges from 1.9 to 5.6. FIGS. 7 and 8 also illustrate a starter 120 interfacing via a tower shaft 55 with the straddle-mounted spool 32A proximate high compressor 52A and interfacing via tower shaft 55 with the overhung mounted spool 32B proximate high compressor 52B as part of a starting system.

Figure 2:
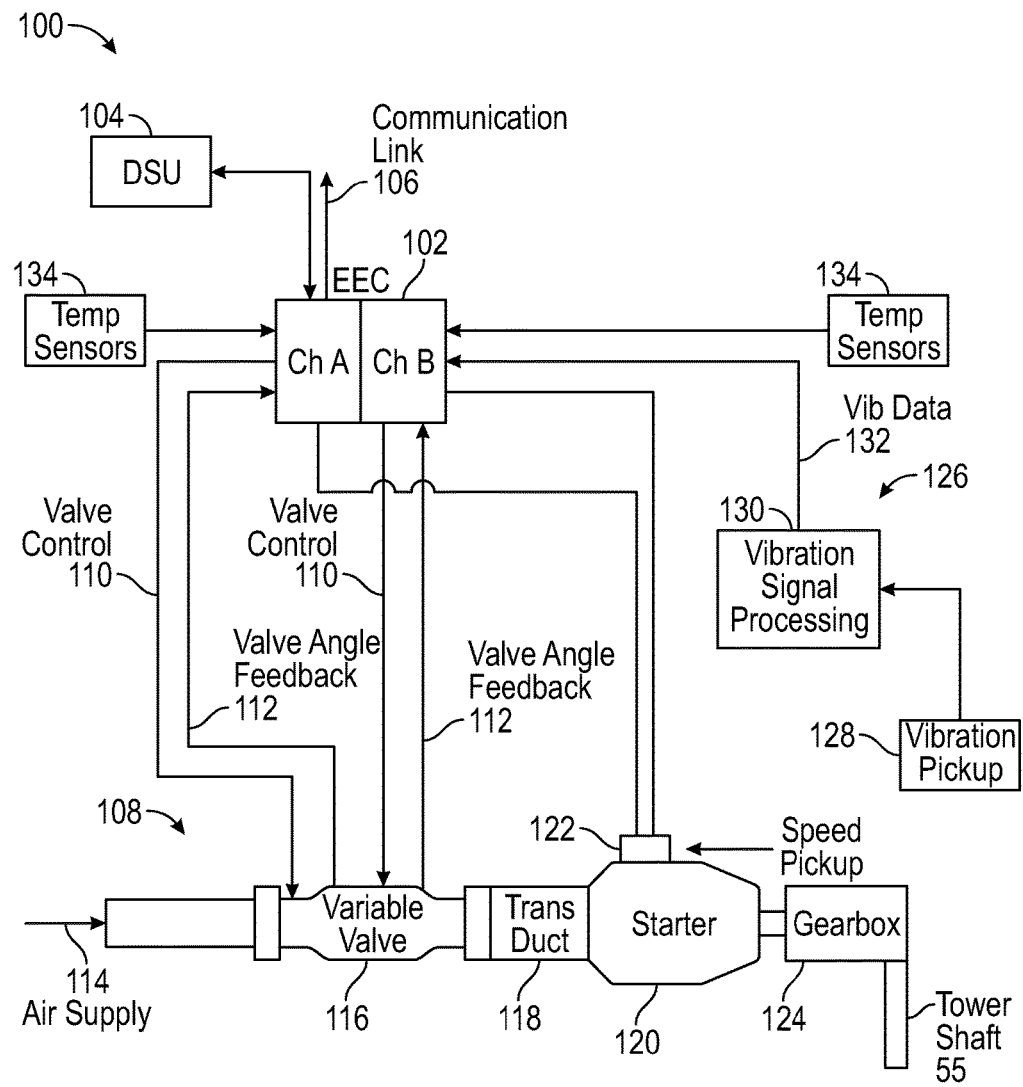
FIG. 2 is a schematic illustration of a starting system for a gas turbine engine in accordance with an embodiment of the disclosure.

Turning now to FIG. 2, a schematic of a starting system 100 for the gas turbine engine 10 of FIG. 1 is depicted according to an embodiment. The starting system 100 is also referred to generally as a gas turbine engine system. In the example of FIG. 2, the starting system 100 includes a controller 102 which may be an electronic engine control, such as a dual-channel FADEC, and/or engine health monitoring unit. In an embodiment, the controller 102 may include memory to store instructions that are executed by one or more processors. The executable instructions may be stored or organized in any manner and at any level of abstraction, such as in connection with a controlling and/or monitoring operation of the engine 10 of FIG. 1. The one or more processors can be any type of central processing unit (CPU), including a general purpose processor, a digital signal processor (DSP), a microcontroller, an application specific integrated circuit (ASIC), a field programmable gate array (FPGA), or the like. Also, in embodiments, the memory may include random access memory (RAM), read only memory (ROM), or other electronic, optical, magnetic, or any other computer readable medium onto which is stored data and control algorithms in a non-transitory form.

The starting system 100 can also include a data storage unit (DSU) 104 that retains data between shutdowns of the gas turbine engine 10 of FIG. 1. The DSU 104 includes non-volatile memory and retains data between cycling of power to the controller 102 and DSU 104. A communication link 106 can include an aircraft and/or test stand communication bus to interface with aircraft controls, e.g., a cockpit, various onboard computer systems, and/or a test stand.

A motoring system 108 is operable to drive rotation of a starting spool (e.g., high speed spool 32) of the gas turbine engine 10 of FIG. 1. Either or both channels of controller 102 can output a valve control signal 110 operable to dynamically adjust a valve angle of a variable position starter valve 116 that selectively allows a portion of an air supply 114 to pass through the variable position starter valve 116 and a transfer duct 118 to an air turbine starter 120 (also referred to as starter 120). The air supply 114 (also referred to as starter air supply 114) can be provided by any known source of compressed air, such as an auxiliary power unit or ground cart. The variable position starter valve 116 is a continuous/infinitely adjustable valve that can hold a commanded valve angle, which may be expressed in terms of a percentage open/closed and/or an angular value (e.g., degrees or radians). Performance parameters of the variable position starter valve 116 can be selected to meet dynamic response requirements of the starting system 100. For example, in some embodiments, the variable position starter valve 116 has a response rate of 0% to 100% open in less than 40 seconds. In other embodiments, the variable position starter valve 116 has a response rate of 0% to 100% open in less than 30 seconds. In further embodiments, the variable position starter valve 116 has a response rate of 0% to 100% open in less than 20 seconds.

The controller 102 can monitor a valve angle of the variable position starter valve 116 using valve angle feedback signals 112 provided to both channels of controller 102. As one example, in an active/standby configuration, both channels of the controller 102 can use the valve angle feedback signals 112 to track a current valve angle, while only one channel designated as an active channel outputs valve control signal 110. Upon a failure of the active channel, the standby channel of controller 102 can take over as the active channel to output valve control signal 110. In an alternate embodiment, both channels of controller 102 output all or a portion of a valve angle command simultaneously on the valve control signals 110. The controller 102 can also monitor a speed sensor, such as speed pickup 122 that may monitor the speed of the engine rotor through its connection to the accessory gearbox which is in turn connected to the high spool via tower shaft 55 (e.g., rotational speed of high speed spool 32) or any other such sensor for detecting or determining the speed of the gas turbine engine 10 of FIG. 1. The starter 120 may be coupled to a gearbox 124 of the gas turbine engine 10 of FIG. 1 directly or through a transmission such as a clutch system (not depicted). The controller 102 can establish an outer control loop with respect to rotor speed and an inner control loop with respect to the valve angle of the variable position starter valve 116.

In the example of FIG. 2, the engine also includes a vibration monitoring system 126. The vibration monitoring system 126 includes at least one vibration pickup 128, e.g., an accelerometer, operable to monitor vibration of the gas turbine engine 10 of FIG. 1. Vibration signal processing 130 can be performed locally with respect to the vibration pickup 128, within the controller 102, or through a separate vibration processing system, which may be part of an engine health monitoring system to acquire vibration data 132. Alternatively, the vibration monitoring system 126 can be omitted in some embodiments.

One or more temperature sensors 134, such as thermocouples, can provide measured temperatures at associated locations of the gas turbine engine 10 to the controller 102. For example, the temperature sensors 134 can be located at station 2 (T2), station 2.5 (T2.5), station 3 (T3), station 4 (T4), station 4.5 (T4.5), and/or station 5 (T5) as previously described with respect to FIG. 1.

Figure 3:
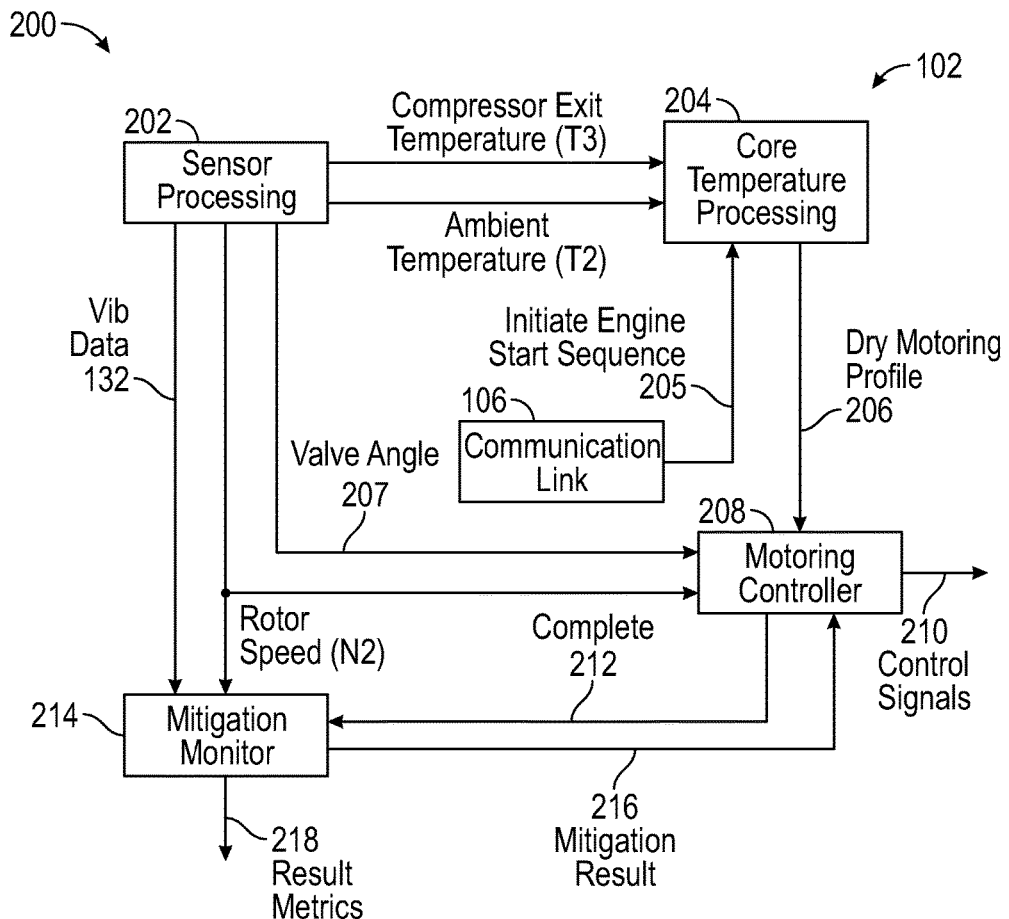
FIG. 3 is a block diagram of a system for bowed rotor start mitigation in accordance with an embodiment of the disclosure.

FIG. 3 is a block diagram of a system 200 for bowed rotor start mitigation using the variable position starter valve 116 of FIG. 2 in accordance with an embodiment. The system 200 may also be referred to as a bowed rotor start mitigation system. In the example of FIG. 3, the system 200 includes sensor processing 202 operable to acquire and condition data from a variety of sensors such as the valve angle feedback 112, speed pickup 122, vibration pickup 128, and temperature sensors 134 of FIG. 2. In the example of FIG. 3, sensor processing 202 provides compressor exit temperature T3 and ambient temperature T2 to core temperature processing 204. Alternatively or additionally, one or more temperature values from stations 4 (T4), 4.5 (T4.5), and/or 5 (T5) can be provided to core temperature processing 204. Sensor processing 202 provides a valve angle 207 to a motoring control 208 based on the valve angle feedback 112. Sensor processing 202 can provide rotor speed N2 (i.e., speed of high speed spool 32) to the motoring controller 208 and a mitigation monitor 214. Sensor processing 202 may also provide vibration data 132 to mitigation monitor 214. The sensor processing 202, core temperature processing 204, motoring controller 208, and/or mitigation monitor 214 may be part of controller 102.

In some embodiments, a heat state of the engine 10 or $T_{core}$ is determined by the core temperature processing 204. When the gas turbine engine 10 has stopped rotating (e.g., rotor speed N2 is zero), the compressor exit temperature T3 may be substantially equal to $T_{core}$. In some embodiments, $T_{core}$ is set equal to T3-T2 to adjust the temperature with respect to the measured ambient temperature of the gas turbine engine 10. Further, temperature readings from other stations of the gas turbine engine 10 can be used to determine $T_{core}$. Communication link 106 can provide the core temperature processing 204 with an indication 205 that a start sequence of the gas turbine engine 10 has been initiated. Once rotation of the gas turbine engine 10 begins, temperature readings can be collected for a predetermined period of time, such as ten to thirty seconds. The temperature readings, e.g., T3 or T3-T2, can be averaged as core temperature $T_{core}$ before the temperature starts to change due to air flow from engine rotation. The core temperature processing 204 can determine a bowed rotor risk parameter that is based on the measured temperature using a mapping function or lookup table. The bowed rotor risk parameter can have an associated dry motoring profile 206 defining a target rotor speed profile over an anticipated amount of time for the motoring controller 208 to send control signals 210, such as valve control signals 110 for controlling variable position starter valve 116 of FIG. 2. For example, a higher risk of a bowed rotor may result in a longer duration of dry motoring to reduce a temperature gradient prior to starting the gas turbine engine 10 of FIG. 1.

Figure 5:
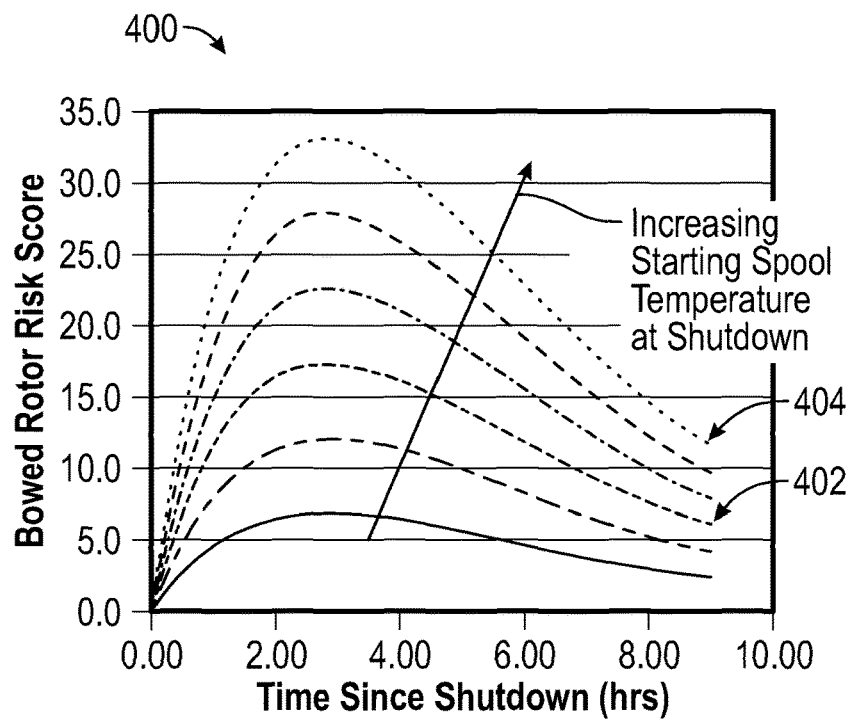
FIG. 5 is a graph illustrating a bowed rotor risk score with respect to time in accordance with an embodiment of the disclosure.
Figure 10:
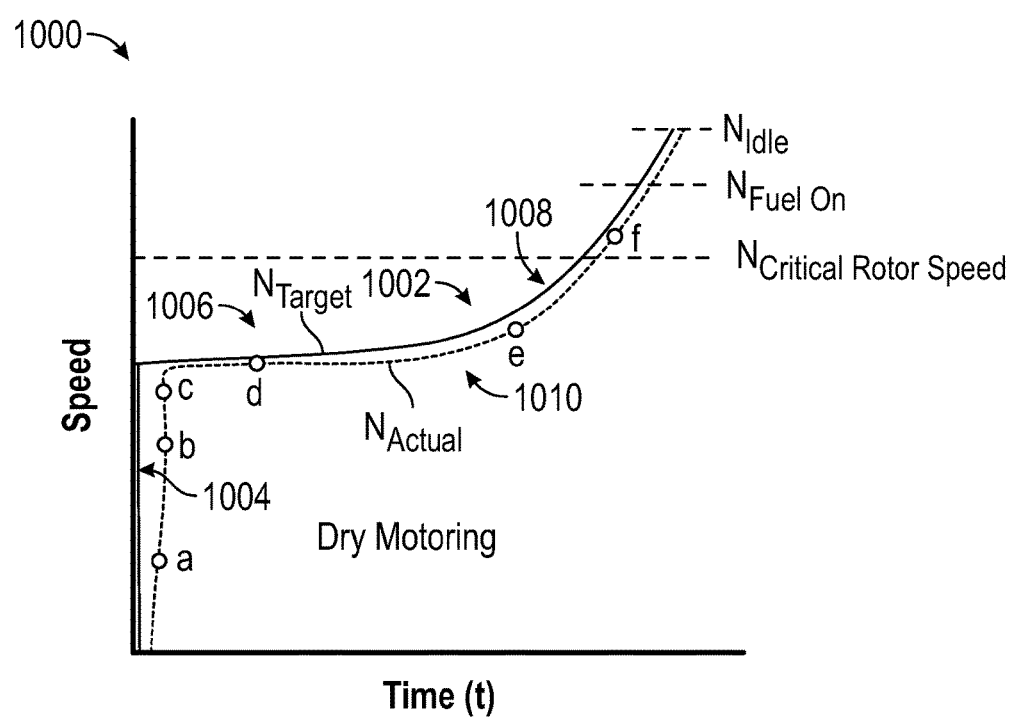
FIG. 10 is a graph illustrating a target rotor speed profile of a dry motoring profile and an actual rotor speed versus time in accordance with an embodiment of the disclosure.

The bowed rotor risk parameter may be quantified according to a profile curve 402 selected from a family of curves 404 that align with observed aircraft/engine conditions that impact turbine bore temperature and the resulting bowed rotor risk as depicted in the example graph 400 of FIG. 5. For instance, a higher risk of a bowed rotor may result in a longer duration of dry motoring to reduce a temperature gradient prior to starting the gas turbine engine 10 of FIG. 1. An anticipated amount of dry motoring time can be used to determine a target rotor speed profile in the dry motoring profile 206 for the currently observed conditions. As one example, one or more baseline characteristic curves for the target rotor speed profile can be defined in tables or according to functions that may be rescaled to align with the observed conditions. An example of a target rotor speed profile 1002 is depicted in graph 1000 of FIG. 10 that includes a steep initial transition portion 1004, followed by a gradually increasing portion 1006, and a late acceleration portion 1008 that increases rotor speed above a critical rotor speed, through a fuel-on speed and an engine idle speed. The target rotor speed profile 1002 can be rescaled with respect to time and/or select portions (e.g., portions 1004, 1006, 1008) of the target rotor speed profile 1002 can be individually or collectively rescaled (e.g., slope changes) with respect to time to extend or reduce the total motoring time. The target rotor speed profile 1002 may include all positive slope values such that the actual rotor speed 1010 is driven to essentially increase continuously while bowed rotor start mitigation is active. While the example of FIG. 10 depicts one example of the target rotor speed profile 1002 that can be defined in the dry motoring profile 206 of FIG. 3, it will be understood that many variations are possible in embodiments.

With continued reference to FIGS. 1-10, as used herein, motoring of the engine 10 in a modified start sequence refers to the turning of a starting spool by the starter 120 at a reduced speed without introduction of fuel and an ignition source in order to cool the engine 10 to a point wherein a normal start sequence can be implemented without starting the engine 10 in a bowed rotor state. In other words, cool or ambient air is drawn into the engine 10 while motoring the engine 10 at a reduced speed in order to clear the "bowed rotor" condition, which is referred to as a dry motoring mode.

The motoring controller 208 can use a dynamic control calculation in order to determine a required valve position of the variable position starter valve 116 used to flow an air supply or starter air supply 114 to the engine 10 in order to limit the motoring speed of the engine 10 due to the position (i.e., valve angle 207) of the variable position starter valve 116. The required valve position of the variable position starter valve 116 is determined based upon an air supply pressure as well as other factors including but not limited to ambient air temperature, compressor horsepower requirements, parasitic drag on the engine 10 from a variety of engine driven components such as electric generators and hydraulic pumps, and other variables such that the motoring controller 208 closes the loop for a motoring band of speeds according to the dry motoring profile 206. Dynamic adjustments of the valve angle 207 are made to maintain the rotor speed (e.g., N2 or actual rotor speed 1010) along the target rotor speed profile 1002 defined in the dry motoring profile 206.

Figure 9:
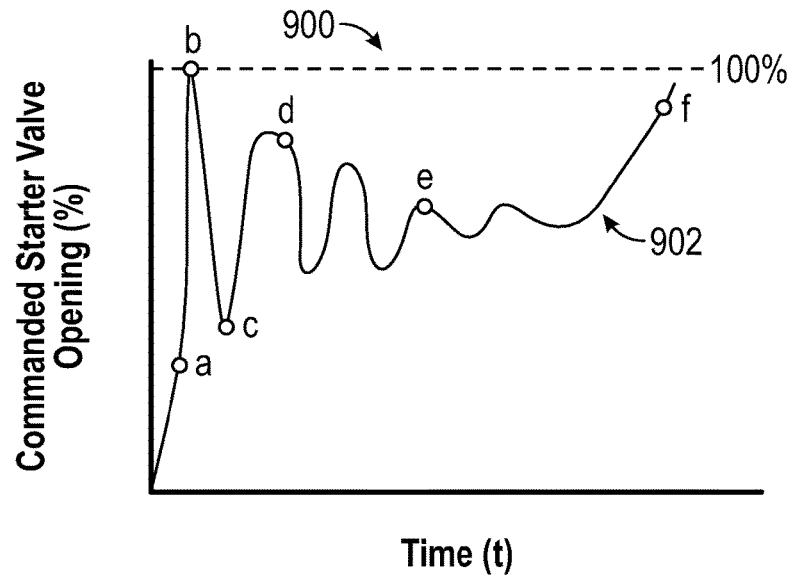
FIG. 9 is a graph illustrating commanded starter valve opening with respect to time in accordance with an embodiment of the disclosure.

The example of FIG. 9 illustrates how a valve angle command 902 is adjusted between 0 to 100% of a commanded starter valve opening to generate the actual rotor speed 1010. As the actual rotor speed 1010 tracks to the steep initial transition portion 1004 of the target rotor speed profile 1002, the valve angle command 902 transitions through points "a" and "b" to fully open the variable position starter valve 116. As the slope of the target rotor speed profile 1002 is reduced in the gradually increasing portion 1006, the valve angle command 902 is reduced between points "b" and "c" to prevent the actual rotor speed 1010 from overshooting the target rotor speed profile 1002. In some embodiments, decisions to increase or decrease the commanded starter valve opening is based on monitoring a rate of change of the actual rotor speed 1010 and projecting whether the actual rotor speed 1010 will align with the target rotor speed profile 1002 at a future time. If it is determined that the actual rotor speed 1010 will not align with the target rotor speed profile 1002 at a future time, then the valve angle of the variable position starter valve 116 is adjusted (e.g., increase or decrease the valve angle command 902) at a corresponding time. In the example of FIGS. 9 and 10, the valve angle command 902 oscillates with a gradually reduced amplitude between points "c", "d", and "e" as the actual rotor speed 1010 tracks to the target rotor speed profile 1002 through the gradually increasing portion 1006.

As dry motoring continues, the overall homogenization of the engine 10 increases, which allows the actual rotor speed 1010 to safely approach the critical rotor speed without risking damage. The valve angle command transitions from point "e" to point "f" and beyond to further increase the actual rotor speed 1010 in the late acceleration portion 1008 above the critical rotor speed, through a fuel-on speed and an engine idle speed. By continuously increasing the actual rotor speed 1010 during dry motoring, the bowed rotor condition can be reduced faster than holding a constant slower speed.

In reference to FIG. 3, the mitigation monitor 214 can operate in response to receiving a complete indicator 212 to run a verification of the bowed rotor mitigation. The mitigation monitor 214 can provide mitigation results 216 to the motoring controller 208 and may provide result metrics 218 to other systems, such a maintenance request or indicator. Peak vibrations can be checked by the mitigation monitor 214 during the start processes to confirm that bowed rotor mitigation successfully removed the bowed rotor condition. The mitigation monitor 214 may also run while dry motoring is active to determine whether adjustments to the dry motoring profile 206 are needed. For example, if a greater amount of vibration is detected than was expected, the mitigation monitor 214 can request that the motoring controller 208 reduce a slope of the target rotor speed profile 1002 of FIG. 10 to extend the dry motoring time before driving the actual rotor speed 1010 of FIG. 10 up to the critical rotor speed. Similarly, if the magnitude of vibration observed by the mitigation monitor 214 is less than expected, the mitigation monitor 214 can request that the motoring controller 208 increase a slope of the target rotor speed profile 1002 of FIG. 10 to reduce the dry motoring time before driving the actual rotor speed 1010 of FIG. 10 up to the critical rotor speed.

Figure 4:
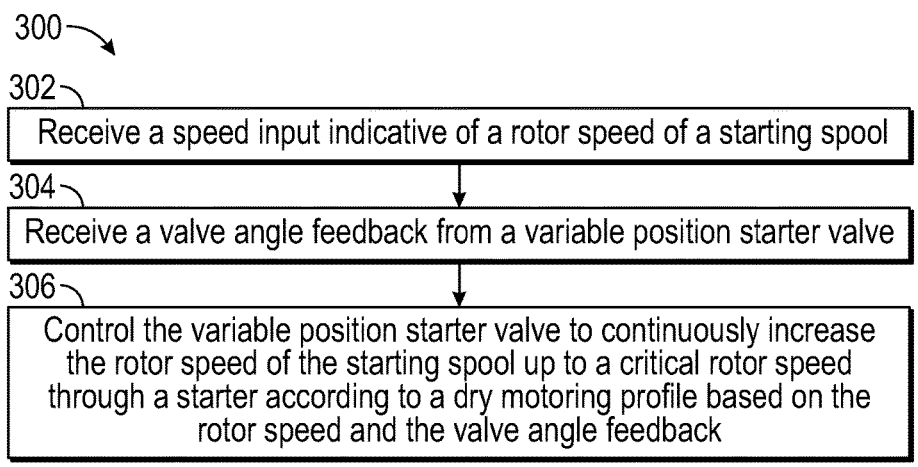
FIG. 4 is a flow chart illustrating a method of bowed rotor start mitigation using a variable position starter valve of a gas turbine engine in accordance with an embodiment of the disclosure.

FIG. 4 is a flow chart illustrating a method 300 of bowed rotor start mitigation using the variable position starter valve 116 of the gas turbine engine 10 in accordance with an embodiment. The method 300 of FIG. 4 is described in reference to FIGS. 1-10 and may be performed with an alternate order and include additional steps. Before initiating bowed rotor start mitigation, a bowed rotor determination step can be performed to estimate a need for bowed rotor start mitigation. Examples include the use of models and/or stored/observed engine/aircraft state data, such as data received from DSU 104, communication link 106, and/or reading data from one or more temperature sensors 134 of the gas turbine engine 10. For instance, a measured temperature can be determined based on reading one or more temperature sensors 134 of the gas turbine engine 10 for a predetermined period of time when a start sequence of the gas turbine engine is initiated (e.g., based on indication 205). The measured temperature may be adjusted with respect to a measured ambient temperature of the gas turbine engine 10 (e.g., T3-T2, T4-T2, etc.).

At block 302, controller 102 receives a speed input indicative of a rotor speed (e.g., N2/actual rotor speed 1010) of a starting spool of the gas turbine engine 10. The speed input may be directly or indirectly indicative of the rotational speed of high speed spool 32, for instance, derived from a rotational speed of gearbox 124, from speed pickup 122, or another source (not depicted).

At block 304, the controller 102 receives valve angle feedback 112 from variable position starter valve 116 of the gas turbine engine 10. Valve angle feedback 112 can be converted by sensor processing 202 into any desired engineering units (e.g., percent open) as valve angle 207 for use by motoring controller 208.

At block 306, the controller 102 dynamically adjusts the variable position starter valve 116 (e.g., using valve control 110/control signals 210) to vary a rotor speed of the starting spool up to a critical rotor speed through starter 120 according to dry motoring profile 206 based on the rotor speed and the valve angle feedback 112 while bowed rotor start mitigation is active. The dry motoring profile 206 can define the target rotor speed profile 1002 as continuously increasing (with varying slopes) to drive the actual rotor speed 1010 to continuously increase while bowed rotor start mitigation is active.

The actual rotor speed 1010 is controlled to track to the target rotor speed profile 1002 of the dry motoring profile 206 that drives the actual rotor speed 1010 to a set value and accelerates the actual rotor speed 1010 through the critical rotor speed. As one example, the variable position starter valve 116 can be initially set to a valve angle of greater than 50% open when bowed rotor start mitigation is active. The controller 102 can monitor a rate of change of the actual rotor speed 1010, project whether the actual rotor speed 1010 will align with the target rotor speed profile 1002 at a future time based on the rate of change of the actual rotor speed 1010, and adjust a valve angle of the variable position starter valve 116 based on determining that the actual rotor speed 1010 will not align with the target rotor speed profile 1002 at a future time.

Further dynamic updates at runtime can include adjusting a slope of the target rotor speed profile 1002 in the dry motoring profile 206 while the bowed rotor start mitigation is active based on determining that a vibration level of the gas turbine engine 10 is outside of an expected range. Adjusting the slope of the target rotor speed profile 1002 can include maintaining a positive slope. Vibration levels may also or alternatively be used to check/confirm successful completion of bowed rotor start mitigation prior to starting the gas turbine engine 10. For instance, based on determining that the bowed rotor start mitigation is complete, a vibration level of the gas turbine engine 10 can be monitored while sweeping through a range of rotor speeds including the critical rotor speed.

The mitigation monitor 214 may receive a complete indicator 212 from the motoring controller 208 when the motoring controller 208 has completed dry motoring, for instance, if the motoring time 206 has elapsed. If the mitigation monitor 214 determines that the bowed rotor condition still exists based on vibration data 132 collected, the motoring controller 208 may restart dry motoring, or a maintenance request or indicator can be triggered along with providing result metrics 218 for further analysis. Metrics of attempted bowed rotor mitigation can be recorded in the DSU 104 based on determining that the attempted bowed rotor mitigation was unsuccessful or incomplete.

Figure 6:
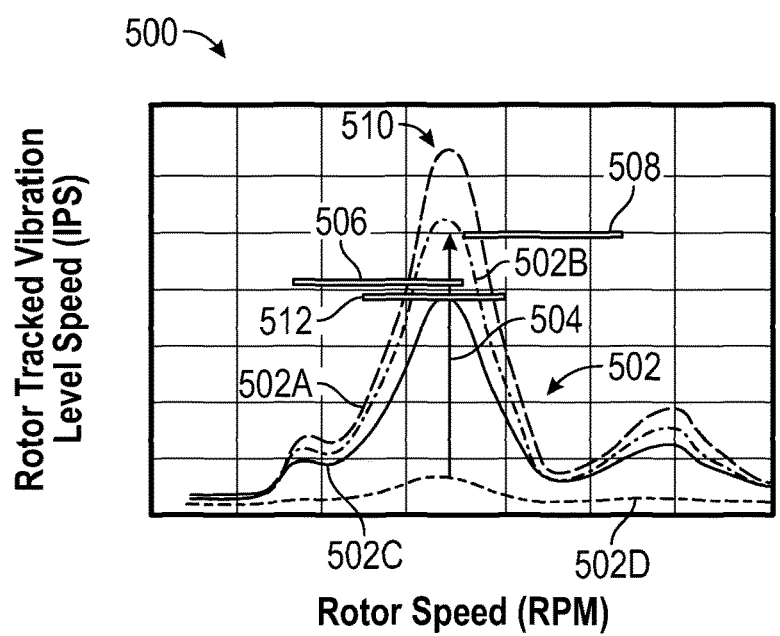
FIG. 6 is a graph illustrating examples of various vibration level profiles of an engine in accordance with an embodiment of the disclosure.

Referring now to FIG. 6, a graph 500 illustrating examples of various vibration level profiles 502 of an engine, such as gas turbine engine 10 of FIG. 1 is depicted. The vibration level profiles 502 represent a variety of possible vibration levels observed before and/or after performing bowed rotor mitigation. Critical rotor speed 510 is the speed at which a vibration peak is expected due to amplification effects of a bowed rotor condition along with other contributions to vibration level generally. A peak vibration 504 at critical rotor speed 510 may be used to trigger different events. For example, if the peak vibration 504 at critical rotor speed 510 is below a maintenance action threshold 506, then no further actions may be needed. If the peak vibration 504 at critical rotor speed 510 is above a damage risk threshold 508, then an urgent maintenance action may be requested such as an engine check. If the peak vibration 504 at critical rotor speed 510 is between the maintenance action threshold 506 and the damage risk threshold 508, then further bowed rotor mitigation actions may be requested, such as extending/restarting dry motoring. In one embodiment, a maintenance request is triggered based on the actual vibration level exceeding maintenance action threshold 506 after completing an attempt of bowed rotor mitigation.

The lowest rotor vibration vs. speed in FIG. 6 (vibration profile 502D) is for a fully homogenized rotor, where mitigation is not necessary (engine parked all night long, for example). The next higher curve shows a mildly bowed rotor and so on. The maintenance action threshold 506 is a threshold for setting a maintenance flag such as requiring a troubleshooting routine of one or more system elements. The damage risk threshold 508 may be a threshold to trigger a more urgent maintenance requirement up to and including an engine check. As dry motoring is performed in embodiments, the gas turbine engine 10 may shift between vibration profiles. For instance, when a bow rotor condition is present, the gas turbine engine 10 may experience vibration levels according to vibration profile 502A, if mitigation is not performed. As dry motoring is run, the gas turbine engine 10 may have a vibration profile that is gradually reduced from vibration profile 502A to vibration profile 502B and then vibration profile 502C, for example. By checking the current vibration level at a corresponding rotor speed with respect to time, the controller 102 can determine whether adjustments are needed to extend or reduce the slope of the target rotor speed profile 1002 of FIG. 10 depending on an expected rate of bowed rotor reduction. In embodiments, a slope of the target rotor speed profile 1002 in the dry motoring profile 206 can be adjusted and maintains a positive slope while bowed rotor start mitigation is active based on determining that a vibration level of the gas turbine engine 10 is less than a targeted maximum range 512, which may define a safe level of vibration to ensure that no risk of a maintenance action or damage will likely occur if the actual rotor speed 1010 is increased faster than previously planned.

Accordingly and as mentioned above, it is desirable to detect, prevent and/or clear a "bowed rotor" condition in a gas turbine engine that may occur after the engine has been shut down. As described herein and in one non-limiting embodiment, the controller 102 may be programmed to automatically take the necessary measures in order to provide for a modified start sequence without pilot intervention other than the initial start request. In an exemplary embodiment, the controller 102 and/or DSU 104 comprises a microprocessor, microcontroller or other equivalent processing device capable of executing commands of computer readable data or program for executing a control algorithm and/or algorithms that control the start sequence of the gas turbine engine. In order to perform the prescribed functions and desired processing, as well as the computations therefore (e.g., the execution of Fourier analysis algorithm(s), the control processes prescribed herein, and the like), the controller 102 and/or DSU 104 may include, but not be limited to, a processor(s), computer(s), memory, storage, register(s), timing, interrupt(s), communication interfaces, and input/output signal interfaces, as well as combinations comprising at least one of the foregoing. For example, the controller 102 and/or DSU 104 may include input signal filtering to enable accurate sampling and conversion or acquisitions of such signals from communications interfaces. As described above, exemplary embodiments of the disclosure can be implemented through computer-implemented processes and apparatuses for practicing those processes.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

The invention claimed is:

1. A bowed rotor start mitigation system for a gas turbine engine, the bowed rotor start mitigation system comprising:
a variable position starter valve; and
a controller operable to dynamically adjust the variable position starter valve to deliver a starter air supply to a starter to drive rotation of a starting spool of the gas turbine engine according to a dry motoring profile that continuously varies a rotor speed of the starting spool up to a point below a critical rotor speed, wherein the controller monitors the rotor speed and dynamically adjusts a valve angle of the variable position starter valve to maintain the rotor speed along a target rotor speed profile defined in the dry motoring profile, wherein increasing a percentage open of the variable position starter valve increases the rotor speed and decreasing a percentage open of the variable position starter valve decreases the rotor speed.

2. The bowed rotor start mitigation system as in claim 1, wherein the target rotor speed profile defined in the dry motoring profile is essentially increasing continuously with respect to time.

3. The bowed rotor start mitigation system as in claim 1, wherein the target rotor speed profile extends above the critical rotor speed and the controller dynamically adjusts the valve angle of the variable position starter valve to maintain the rotor speed along the target rotor speed profile across the critical rotor speed up to an engine idle speed.

4. The bowed rotor start mitigation system as in claim 1, wherein a slope of the target rotor speed profile in the dry motoring profile is adjusted and maintains a positive slope while bowed rotor start mitigation is active based on determining that a vibration level of the gas turbine engine is less than a targeted maximum.

5. The bowed rotor start mitigation system as in claim 1, wherein the variable position starter valve has a response rate of 0% to 100% open in less than 40 seconds.

6. The bowed rotor start mitigation system as in claim 1, wherein the dry motoring profile is selected based on reading data from one or more temperature sensors of the gas turbine engine to estimate heat stored in the gas turbine engine when a start sequence is initiated and identify a risk of a bowed rotor of the gas turbine engine, wherein the dry motoring profile corresponds to a control action to mitigate the risk.

7. The bowed rotor start mitigation system as in claim 1, wherein the gas turbine engine is a turbofan and the starter air supply is provided from an auxiliary power unit.

8. The bowed rotor start mitigation system as in claim 1, wherein based on determining that bowed rotor start mitigation is complete, the controller is operable to monitor a vibration level of the gas turbine engine while sweeping through a range of rotor speeds including the critical rotor speed and determine whether the bowed rotor start mitigation was successful in maintaining the vibration level below a targeted maximum prior to starting the gas turbine engine.

9. A gas turbine engine system comprising:
a motoring system comprising a variable position starter valve and a starter operable to drive rotation of a starting spool of a gas turbine engine;
a speed pickup; and
an electronic engine control operable to receive a speed input from the speed pickup indicative of a rotor speed of the starting spool and a valve angle feedback from the variable position starter valve, the electronic engine control further operable to drive motoring of the starting spool by controlling the variable position starter valve to continuously increase the rotor speed of the gas turbine engine up to a critical rotor speed through the starter according to a target rotor speed profile defined in a dry motoring profile based on the rotor speed and the valve angle feedback, wherein increasing a percentage open of the variable position starter valve increases the rotor speed and decreasing a percentage open of the variable position starter valve decreases the rotor speed.

10. The gas turbine engine as in claim 9, wherein the target rotor speed profile of the dry motoring profile drives the rotor speed to a set value and accelerates the rotor speed through the critical rotor speed.

11. The gas turbine engine as in claim 9, wherein the dry motoring profile is selected based on reading data from one or more temperature sensors of the gas turbine engine to estimate heat stored in the gas turbine engine when a start sequence is initiated and identify a risk of a bowed rotor of the gas turbine engine.

12. A method of bowed rotor start mitigation for a gas turbine engine, the method comprising:
receiving, by a controller, a speed input indicative of a rotor speed of a starting spool of the gas turbine engine;
receiving, by the controller, a valve angle feedback from a variable position starter valve of the gas turbine engine; and
controlling the variable position starter valve to continuously increase the rotor speed of the starting spool up to a critical rotor speed through a starter according to a target rotor speed profile defined in a dry motoring profile based on the rotor speed and the valve angle feedback, wherein increasing a percentage open of the variable position starter valve increases the rotor speed and decreasing a percentage open of the variable position starter valve decreases the rotor speed.

13. The method as in claim 12, wherein the rotor speed is controlled to track to the target rotor speed profile of the dry motoring profile that drives the rotor speed to a set value and accelerates the rotor speed through the critical rotor speed.

14. The method as in claim 13, further comprising:
monitoring a rate of change of the rotor speed;
projecting whether the rotor speed will align with the target rotor speed profile at a future time based on the rate of change of the rotor speed; and
adjusting a valve angle of the variable position starter valve based on determining that the rotor speed will not align with the target rotor speed profile at a future time.

15. The method as in claim 13, further comprising:
adjusting a slope of the target rotor speed profile in the dry motoring profile based on determining that a vibration level of the gas turbine engine is outside of an expected range to reduce the slope of the target rotor speed profile to extend a dry motoring time before driving the rotor speed up to the critical rotor speed based on determining that the vibration level is above the expected range and to increase the slope of the target rotor speed profile to reduce the dry motoring time before driving the rotor speed up to the critical rotor speed based on determining that the vibration level is below the expected range.

16. The method as in claim 15, wherein adjusting the slope of the target rotor speed profile further comprises maintaining a positive slope.

17. The method as in claim 12, further comprising:
selecting the dry motoring profile based on reading data from one or more temperature sensors of the gas turbine engine to estimate heat stored in the gas turbine engine when a start sequence is initiated and identify a risk of a bowed rotor of the gas turbine engine prior to driving rotation of the gas turbine engine.

18. The method as in claim 12, wherein the variable position starter valve is initially set to a valve angle of greater than 50% open.

19. The method as in claim 12, further comprising:
based on determining that the bowed rotor start mitigation is complete, monitoring a vibration level of the gas turbine engine while sweeping through a range of rotor speeds including the critical rotor speed; and
determining whether the bowed rotor start mitigation was successful in maintaining the vibration level below a targeted maximum prior to starting the gas turbine engine.

* * * * *